Nov. 6, 1934.  M. SHOELD  1,980,007
METHOD OF REMOVING AMMONIA FROM GASES
Filed Dec. 15, 1931
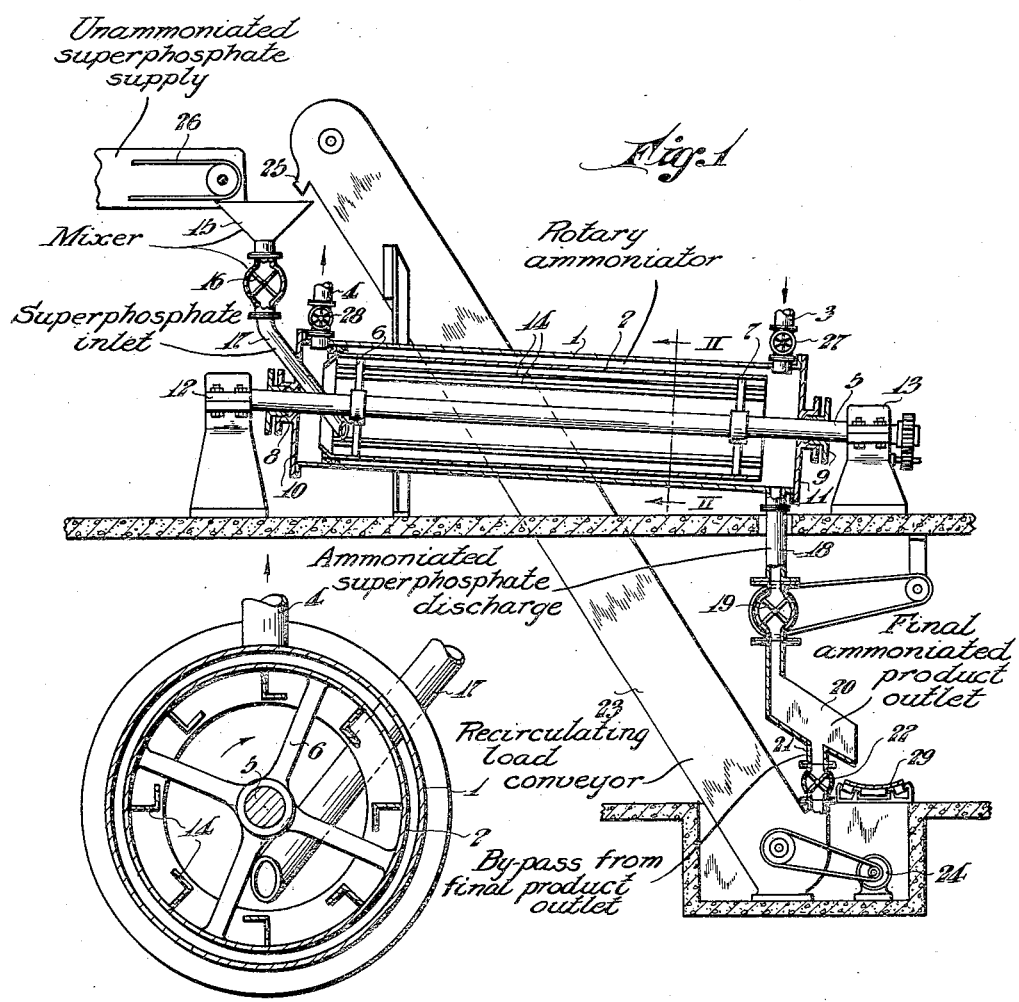

Patented Nov. 6, 1934

1,980,007

UNITED STATES PATENT OFFICE 1,980,007

METHOD OF REMOVING AMMONIA FROM GASES

Mark Shoeld, Mount Lebanon Township, Allegheny County, Pa., assignor to The Koppers Company of Delaware, a corporation of Delaware Application December 15, 1931, Serial No. 581,112

6 Claims. (Cl. 23—3)

This invention relates to processes of and apparatus for treatment of fuel gas, and more particularly to the removal of ammonia from fuel gas, such as gas produced in coal distillation plants.

Ordinarily in the treatment of coke-oven gas, for instance, the gas from the collecting main of a coke oven is passed through a primary cooler and washed with ammonia liquor and then through a series of apparatus including an exhauster, tar extractors, and a saturator wherein ammonia is removed by means of sulphuric acid. Heretofore the prevailing practice in ammonia removal has been to use a liquid reagent for treating ammonia-containing gases.

By the process of the present invention, it has been made commercially possible to efficiently remove ammonia from gas by means of solid materials which are in such condition that they can be readily circulated through a gas-treating apparatus.

The solid material which is used in the present process is a mixture of superphosphate, preferably freshly made, and ammoniated superphosphate. I have found that such a mixture, due to the presence of ammoniated superphosphate, is in a free-flowing, non-sticking and non-caking condition, and more readily absorbs ammonia from fuel gases than when the superphosphate is not previously mixed with the ammoniated material.

A form of superphosphate which is highly desirable and which is preferred in the present process, is of the nature described in the patent to Messrs. Ober and Wight, No. 1,947,138. This superphosphate product is prepared by a process in which phosphate rock and acid are thoroughly and quickly mixed and charged into a rotating autoclave. The acid and phosphate rock react to form superphosphate and during this reaction the autoclave is kept rotating while the material therein is kept under superatmospheric pressure or normal or reduced pressures.

The reaction is very soon completed and while continuing the rotation of the autoclave, the material is placed under a vacuum and dried and cooled. The resulting product is dumped out of the autoclave in the form of nodules or porous balls of various sizes. The fines may be separated out by screening and the larger globular masses may be ground to any desirable size.

In applications of Frederick W. Sperr, Jr., Serial No. 505,090, filed December 27, 1930, and Serial No. 505,091, filed December 27, 1930, the above-described superphosphate has been successfully used in ammonia-removal processes by passing the ammonia-containing gas in contact with superphosphate which is moved countercurrently to or concurrently with the gas through a tray-type apparatus.

By the present process and apparatus, improved results are obtained. A mixture of unammoniated superphosphate and ammoniated superphosphate containing, for instance, up to about 5% by weight of ammonia, is passed into intimate contact with gas containing ammonia in apparatus of the type described in the aforesaid applications of Frederick W. Sperr, Jr., or preferably of the type to be described below. Portions of the ammoniated material coming from the contact apparatus are mixed with additional superphosphate and the mixture passed through the apparatus. This circulation of mixed fresh superphosphate and ammoniated superphosphate is preferably carried on continuously.

The ratios of ammoniated superphosphate to unammoniated superphosphate which have been found to give good results are 1:1 up to 3:1 by weight. The amount of gas which is brought into contact with the mixture, as well as the amount of unammoniated material, is regulated so that the analysis of the material discharged from the contact apparatus shows an ammonia content up to substantially 5%. In this condition, the surplus of ammoniated material can be readily sold as a by-product fertilizer.

A preferred form of apparatus which is adapted to the present process is shown in the accompanying drawing, in which Figure 1 is a cross-sectional view partly in elevation of the entire apparatus; and Fig. 2 is a cross-section of a portion of the apparatus of Fig. 1, on line II—II in the direction of the arrows.

The apparatus shown comprises a stationary cylinder 1, a rotatable open-ended cylinder 2 mounted within the cylinder 1, gas inlet means 3 connected to one end of the stationary cylinder, gas outlet means 4 connected to the other end of the stationary cylinder, and means for circulating superphosphate material.

The rotatable cylinder 2 is mounted on a shaft 5 by means of spokes 6 and 7 adjacent both ends of the cylinder. The shaft passes longitudinally through the center of the cylinder 2 which is spaced from the walls of the cylinder 1. The shaft 5 passes through stuffing boxes 8 and 9 in the end walls 10 and 11, respectively, of the cylinder 1 and rests on bearings 12 and 13 situated beyond the ends of the cylinder 1. The shaft 5 may be rotated by any suitable means (not shown).

The cylinder 2 is preferably placed in an inclined position and, at the upper end, means are provided for charging the mixture of ammoniated and unammoniated material into the same. At the lower end, means are provided on the wall of the cylinder 2 to agitate the material and to move it along while the cylinder is rotating.

The charging apparatus comprises a hopper 15, a star feeder valve 16 beneath the said hopper and a pipe 17 which passes through the end-wall 10 of the cylinder 1 and into the upper end of the rotatable cylinder 2.

The discharge apparatus comprises a pipe 18 connected to the lower end of cylinder 1 beneath the lower end of cylinder 2. In the pipe 18 is a valve 19 similar to valve 16, and the lower end of pipe 18 leads to a chute 20. Leading from the bottom of the chute 20 is a bypass pipe 21 having a star feeder valve 22 for feeding material to a bucket conveyor 23.

The bucket conveyor is preferably enclosed and is operated by a motor 24 or other means. The conveyor 23 effects the transfer of ammoniated material from the discharge end to the charging end of the cylinder 2. The material passes from the conveyor through a spout 25 and into the hopper 15 of the charging apparatus.

In order to bring about an intimate contact between the solid material and the gas, the cylinder 2 may be provided with any suitable means for agitating the material while in the presence of the gas. In the apparatus shown, a plurality of lifters in the form of angle irons 14 are arranged longitudinally within the cylinder 2 and equally spaced on the inner wall thereof. When the cylinder 2 is rotating, the angle irons operate to pick up the solid material at the bottom of the cylinder and to dump the material vertically through the gas as it passes around with the cylinder.

In the operation of the apparatus described, unammoniated superphosphate conveyed by a belt 26 is dumped into the hopper 15 and mixed with ammoniated superphosphate. The valve 16 is kept in rotation so as to continuously feed the mixture into the rotating cylinder 2. Valves 27 and 28 in pipes 3 and 4, respectively, are opened to the desired extent to permit the passage of gas containing ammonia through the cylinder 2, preferably countercurrent to the superphosphate material.

The solid material within the cylinder 2 gradually passes to the outlet end and drops into the pipe 18. By means of the valve 19, the material is continuously dropped into the chute 20. A portion of the ammoniated material passes into the bucket conveyor 23 and is conveyed to the hopper 15 to be mixed with further amounts of superphosphate. Any surplus ammoniated material passes down the chute 20 onto the belt 29. The material from the belt may be packed and shipped as fertilizer.

The time of contacting the solid material with the gas, or, in other words, the rates of passing the solid material and the gases through the cylinder 2 may be regulated by adjusting the valves 27 and 28 and by the rate of rotation of the star feeder valves 16 and 19, and of the cylinder 2.

The proportions of unammoniated to ammoniated materials in the mixture to be passed into the cylinder 2 are controlled by the rate of feeding these materials to the hopper 15, that is, by means of the rotating valve 22, the conveyor 23 and the belt 26. Any suitable mixing means may be used in the hopper 15 for mixing together the desired proportions of ammoniated and unammoniated material, although sufficient mixing of these materials is brought about within the cylinder 2.

By means of the above process and apparatus, it has been found possible to remove ammonia from coke-oven gas, for instance, containing about 300 to 350 grains of ammonia per 100 cubic feet and to reduce it down to a predetermined point of, for instance, 5 to 10 grains per 100 cubic feet while the rate of gas flow through the contact apparatus is increased from two to three times the rate used when no recirculation of ammoniated material is employed.

It has been found that ammoniated superphosphate is in a better physical condition than unammoniated superphosphate and a mixture of the two is in better physical condition than superphosphate alone. By reason of its free-flowing properties, feeding troubles and operating difficulties in passing material through the contact apparatus are substantially eliminated.

I claim as my invention:

1. A method of purifying fuel gases of ammonia, comprising mixing unammoniated superphosphate with ammoniated superphosphate that has been ammoniated up to about 5%, contacting the mixture with fuel gas containing ammonia, purifying said gas of its ammonia by the contacting with said mixture, and removing the mixture from contact with the gas when the ammoniated mixture analyzes as material ammoniated up to about 5%.

2. A method of purifying coke oven gas of its ammonia, comprising mixing one part by weight unammoniated superphosphate with one to three parts by weight of ammoniated superphosphate that has been ammoniated up to about 5%, contacting the mixture with coke oven gas containing ammonia, purifying said gas of its ammonia by the contacting with said mixture, and removing the mixture from contact with the gas when the ammoniated mixture analyzes as material ammoniated up to about 5%.

3. A method of purifying fuel gases of ammonia, comprising passing a mixture of unammoniated superphosphate and superphosphate that has previously analyzed as ammoniated up to about 5% into a zone for contact with fuel gas containing ammonia, passing the mixture through the zone, continuously passing the fuel gas containing ammonia through the zone in contact with the mixture, continuously introducing unammoniated superphosphate into said zone and continuously withdrawing ammoniated superphosphate from the zone of contact when analyzing as ammoniated up to substantially 5%, and maintaining a recirculating load in said zone of ammoniated superphosphate analyzing as aforesaid in mixture with the unammoniated superphosphate continuously introduced as aforesaid into said zone, by continuously recirculating and mixing a portion of the ammoniated superphosphate withdrawn from the zone with the unammoniated superphosphate being introduced into said zone.

4. A method of purifying coke oven gases of ammonia, comprising passing a free-flowing, non-sticking, non-caking mixture of superphosphate and ammoniated superphosphate that was ammoniated up to about 5% into a zone to contact the same with the coke oven gas to be purified of its ammonia, passing the coke oven gas containing ammonia through said zone while lifting and dropping the mixture in divided condition through the coke oven gas, withdrawing the superphosphate mixture from the zone where the mixture analyzes as a 5% ammoniated material, mixing a portion of the ammoniated material so withdrawn from the zone with unammoniated superphosphate being introduced to said zone for contact to form a free-flowing, non-sticking, non-caking mixture, passing the mixture into the zone to contact with the coke oven gas containing ammonia and withdrawing the mixture from said zone when it analyzes as a 5% ammoniated material.

5. A method of purifying coke oven gases of ammonia, comprising mixing a mixture of unammoniated superphosphate and ammoniated superphosphate and ammoniated superphosphate analyzing up to about 5% ammoniation, passing the mixture through a zone to contact the mixture with ammonia containing coke oven gas, passing the coke oven gas to be purified of its ammonia through the zone in contact with the mixture, maintaining the rate of flow of gas and the rate of passing the mixture through the zone such that the ammonia is substantially all removed from the gas and the superphosphate is ammoniated up to about 5%, withdrawing the ammoniated superphosphate material from said zone when ammoniated up to about 5%, and recycling a portion of the so withdrawn material to said mixing step for mixing with unammoniated superphosphate as aforesaid.

6. In a method of purifying fuel gas of its ammonia with the simultaneous production of superphosphate product ammoniated up to about 5% which comprises, continuously passing the fuel gas to be purified of its ammonia through a zone of contact in which the ammonia is removed from the gas by contact with solid superphosphate material continuously moving therethrough, continuously introducing unammoniated solid superphosphate into said zone, and continuously discharging from said zone as a final product of the process solid superphosphate ammoniated up to about 5%: the improvement which comprises maintaining in continuous circulation into and out of said zone, in addition to the input of unammoniated superphosphate and output of the final product of the process, a recirculating load of solid superphosphate ammoniated to about 5%, the material of said load being in mixture in said zone with the material introduced as unammoniated superphosphate, the mixture being discharged from said zone together when the mixture analyzes 5% ammoniation, and the amount of material forming the recirculating load then being separated for recirculation leaving the remainder of the discharged mixture as the final product of the process.

MARK SHOELD.